United States Patent
Hamada et al.

(10) Patent No.: US 10,654,401 B2
(45) Date of Patent: May 19, 2020

(54) DRIVE ASSIST CONTROL APPARATUS AND CONTROL METHOD FOR DRIVE ASSIST

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Koji Hamada, Kariya (JP); Kazuhiko Nakashima, Miyoshi (JP); Tomonari Sawada, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/574,461

(22) PCT Filed: May 7, 2016

(86) PCT No.: PCT/JP2016/002257
§ 371 (c)(1),
(2) Date: Nov. 15, 2017

(87) PCT Pub. No.: WO2016/185683
PCT Pub. Date: Nov. 24, 2016

(65) Prior Publication Data
US 2018/0126897 A1 May 10, 2018

(30) Foreign Application Priority Data
May 21, 2015 (JP) .................................. 2015-103989

(51) Int. Cl.
*B60Q 1/18* (2006.01)
*B60Q 1/08* (2006.01)
(Continued)

(52) U.S. Cl.
CPC ............. *B60Q 1/085* (2013.01); *B60Q 1/143* (2013.01); *B60Q 1/18* (2013.01); *B60Q 1/50* (2013.01);
(Continued)

(58) Field of Classification Search
CPC ...... B60Q 1/085; B60Q 1/18; B60Q 2300/45; B60Q 2300/324
(Continued)

(56) References Cited

U.S. PATENT DOCUMENTS

| | | | |
|---|---|---|---|
| 8,260,536 B2* | 9/2012 | Stefani | B60Q 1/50 |
| | | | 701/418 |
| 2015/0224926 A1* | 8/2015 | Mochizuki | B60R 1/00 |
| | | | 701/36 |
| 2018/0118099 A1* | 5/2018 | Kunii | B60Q 1/04 |

FOREIGN PATENT DOCUMENTS

| | | |
|---|---|---|
| JP | 201095048 A | 4/2010 |
| JP | 2014125147 A | 7/2014 |

* cited by examiner

*Primary Examiner* — Jefferey F Harold
*Assistant Examiner* — Jean W Desir
(74) *Attorney, Agent, or Firm* — Knobbe, Martens, Olson & Bear, LLP

(57) ABSTRACT

A drive assist control apparatus assists a driving of a vehicle by controlling a light image projected on a road surface in front of the vehicle. The drive assist control apparatus includes a light image projector, a change portion detector, and a light image corrector. The light image projector projects an informative light image on the road surface. The informative light image represents information to be displayed to an occupant in the vehicle. The change portion detector detects a gradient change portion where a gradient of the road surface changes. The light image corrector corrects a projection position of the informative light image projected by the light image projector. The light image
(Continued)

corrector moves the projection position to a position nearer to the occupant than the gradient change portion detected by the change portion detector.

10 Claims, 11 Drawing Sheets

(51) Int. Cl.
*B60Q 1/14* (2006.01)
*B60Q 1/50* (2006.01)
*B60Q 9/00* (2006.01)
*G08G 1/16* (2006.01)

(52) U.S. Cl.
CPC .............. *B60Q 9/008* (2013.01); *G08G 1/164* (2013.01); *B60Q 2300/22* (2013.01); *B60Q 2300/324* (2013.01); *B60Q 2300/335* (2013.01); *B60Q 2300/41* (2013.01); *B60Q 2300/45* (2013.01); *B60Q 2400/50* (2013.01); *G08G 1/165* (2013.01)

(58) Field of Classification Search
USPC ................ 348/746, 747, 745, 744, 143, 148
See application file for complete search history.

DRIVE ASSIST CONTROL APPARATUS AND CONTROL METHOD FOR DRIVE ASSIST

CROSS REFERENCE TO RELATED APPLICATION

This application is based on Japanese Patent Application No. 2015-103989 filed on May 21, 2015, the disclosure of which is incorporated herein by reference.

TECHNICAL FIELD

The present disclosure relates to a drive assist control apparatus and a control method for drive assist.

BACKGROUND ART

Conventionally, a drive assist control technique, which assists driving of a subject vehicle by controlling a light image projected on a road surface of a travelling road in front of the subject vehicle, is known as a technique for securing safety.

For example, in the drive assist control technique disclosed in Patent Literature 1, the informative light image, which indicates information to be displayed to an occupant in the subject vehicle, is projected on the road surface. As a result, the occupant of the subject vehicle can drive with safety secured based on the information indicated by the informative light image. A person around the subject vehicle can avoid danger with safety secured based on the information indicated by the informative light image.

PRIOR ART LITERATURE

Patent Literature

Patent Literature 1: JP 2010-95048 A

SUMMARY OF INVENTION

In the drive assist control technique disclosed in Patent Literature 1, a shape or a size of an informative light image is corrected in accordance with gradient angles of a road surface. With this technique, distortion of the informative light image, which is caused by a gradient of the road surface, can be restricted. Thus, when the informative light image is projected to a position farther than a top portion where a gradient of the road surface changes, an intended projection position on which the light image is projected does not exist on the road surface. So, the information cannot be displayed correctly on the road surface. When the informative light image is projected toward a region farther than a sag portion where a gradient of the road surface changes, an actual projection position on which the light image is projected approaches nearer than an intended projection position. So, the information cannot be displayed correctly on the road surface.

In view of the foregoing difficulties, it is an object of the present disclosure to provide a drive assist control apparatus and a control method for drive assist each of which displays information correctly by projecting a light image on a road surface.

According to an aspect of the present disclosure, a drive assist control apparatus assists a driving of a vehicle by controlling a light image projected on a road surface in front of the vehicle. The drive assist control apparatus includes a light image projector, a change portion detector, and a light image corrector. The light image projector projects an informative light image on the road surface. The informative light image represents information to be displayed to an occupant in the vehicle. The change portion detector detects a gradient change portion where a gradient of the road surface changes. The light image corrector corrects a projection position of the informative light image projected by the light image projector. The light image corrector moves the projection position to a position nearer to the occupant than the gradient change portion detected by the change portion detector.

According to another aspect of the present disclosure, a control method for drive assist which assists a driving of a vehicle by controlling a light image projected on a road surface in front of the vehicle is provided. The control method for drive assist includes projecting an informative light image on the road surface, in which the informative light image represents information to be displayed to an occupant in the vehicle; detecting a gradient change portion where a gradient of the road surface changes; and correcting a projection position of the informative light image on the road surface to a position nearer to the occupant than the gradient change portion detected on the road surface.

In the above-described drive assist control apparatus and control method for drive assist, when the gradient change portion, which is a part of the road surface where the gradient changes, is detected, a projection position of the informative light image is corrected to a position nearer to the user than the gradient change portion. With this configuration, the projection of the informative light image to a position farther than the gradient change portion can be avoided. So, the information can be displayed correctly on the road surface.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments of the present disclosure will be described with reference to the drawings. In each embodiment, sections corresponding to items described in the preceding embodiment are denoted by the same reference symbols, and their repetitive description might be omitted. In each embodiment, in the case where only a part of a configuration is described, the precedingly described embodiment can be applied to the other part of the configuration. Except for the combination explicitly indicated by each embodiment, the configurations of the embodiments can be partially combined together unless there is a contradiction although no explicit embodiment is described.

First Embodiment

Figure 1:
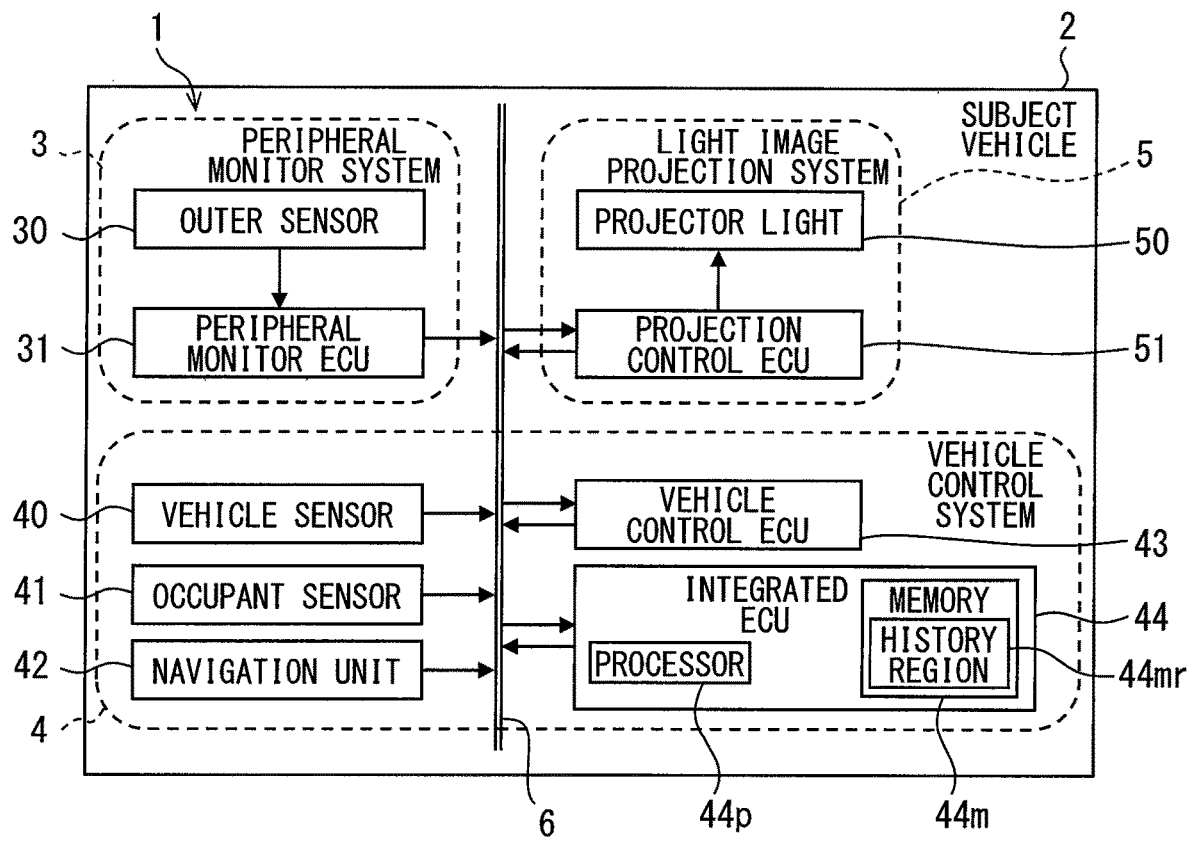
FIG. 1 is a block diagram showing a vehicle system of a first embodiment.
Figure 2:
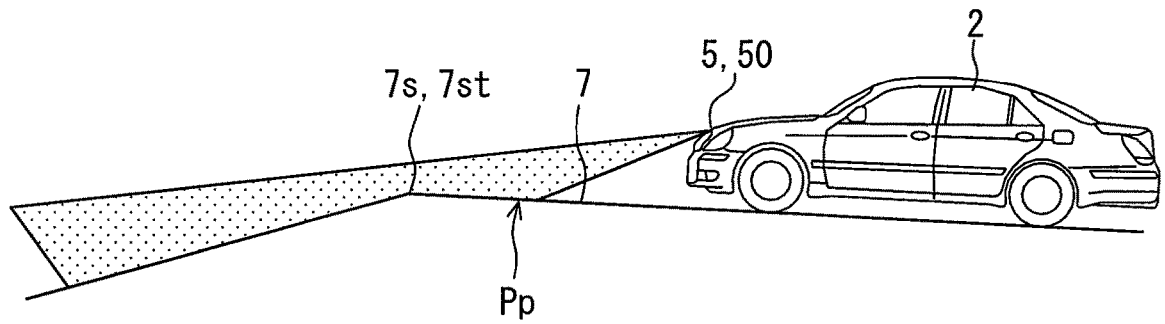
FIG. 2 is a schematic diagram showing a projection of a visible light image by a projector light in FIG. 1 on a road surface.
Figure 3:
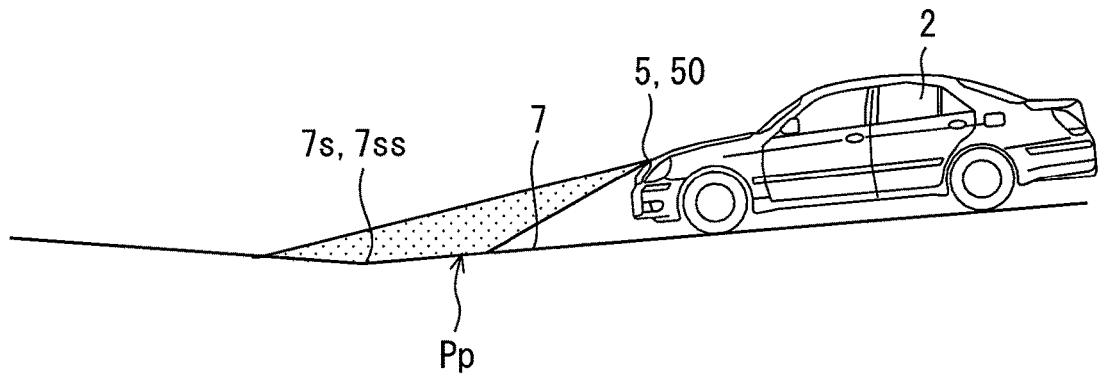
FIG. 3 is a schematic diagram showing the projection of the visible light image by the projector light in FIG. 1 on the road surface.

As shown in FIG. 1, a vehicle system 1 to which a first embodiment of the present disclosure is applied is mounted on a subject vehicle 2 (see FIGS. 2 and 3).

The vehicle system 1 includes a peripheral monitor system 3, a vehicle control system 4, and a light image projection system 5. Each of the systems 3, 4, 5 of the vehicle system 1 is connected to each other via an in-vehicle network 6, such as LAN (Local Area Network).

The peripheral monitor system 3 includes an outer sensor 30 and a peripheral monitor ECU (Electronic Control Unit) 31. The outer sensor 30 may detect a road surface condition, such as a gradient angle, a shape, or a dead angle of a road surface 7. The outer sensor 30 may detect a traffic sign, such as a gradient sign or a traffic indication including a white line of a lane marking, or the like. The outer sensor 30 may detect an obstacle which exists outside the subject vehicle 2 and may collide with the subject vehicle, such as a different vehicle, a structure, a human, or an animal.

The outer sensor 30 may be provided by a sonar, a radar, or a camera. The sonar is provided by an ultrasonic sensor attached to, for example, a front portion or a rear portion of the subject vehicle 2. The sonar receives a reflected wave of an ultrasonic wave that is emitted to a detection area outside the subject vehicle 2. Based on the received reflected ultrasonic wave, the sonar can detect the obstacle, which exists in the detection area. Then, the sonar outputs a detection signal. The radar is provided by a millimeter wave sensor or a laser sensor attached to, for example, a front portion or a rear portion of the subject vehicle 2. The radar receives a reflected wave of a millimeter wave, a submillimeter wave, or a laser that is emitted to a detection area outside the subject vehicle 2. Based on the received reflected wave, the radar can detect the obstacle, which exists in the detection area. Then, the radar outputs a detection signal. The camera is provided by a monocular or a compound eye camera, and is attached to, for example, a room mirror or door mirror of the subject vehicle 2. The camera takes an image of the detection area outside the subject vehicle 2. Based on the image, the camera can detect the obstacle or the traffic sign existing in the detection area. Then, the camera outputs a light image signal.

The peripheral monitor ECU 31 is mainly provided by a microcomputer having a processor and a memory, and is connected to the outer sensor 30 and the in-vehicle network 6. The peripheral monitor ECU 31 may receive traffic information or obstacle information based on the signal output from the outer sensor 30. The traffic information includes the road condition and the traffic sign, and the obstacle information includes a relative position between the subject vehicle 2 and the obstacle.

Figure 4:
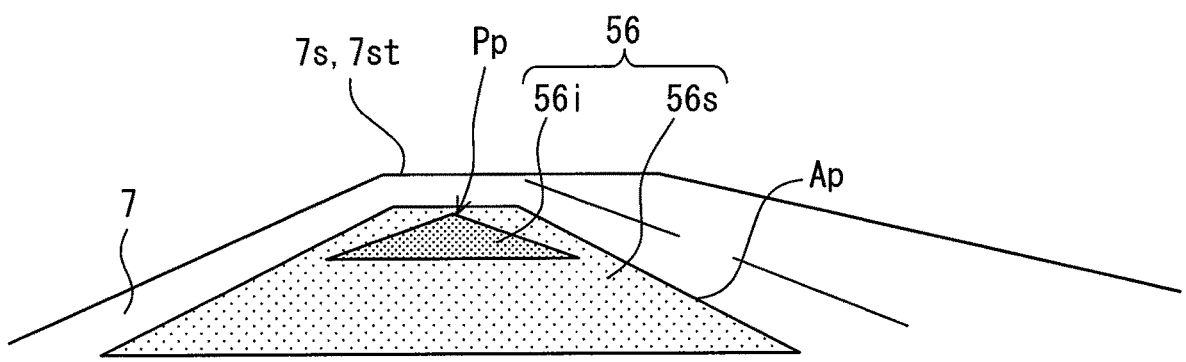
FIG. 4 is a schematic diagram showing the projection of the visible light image by the projector light in FIG. 1 on the road surface.
Figure 5:
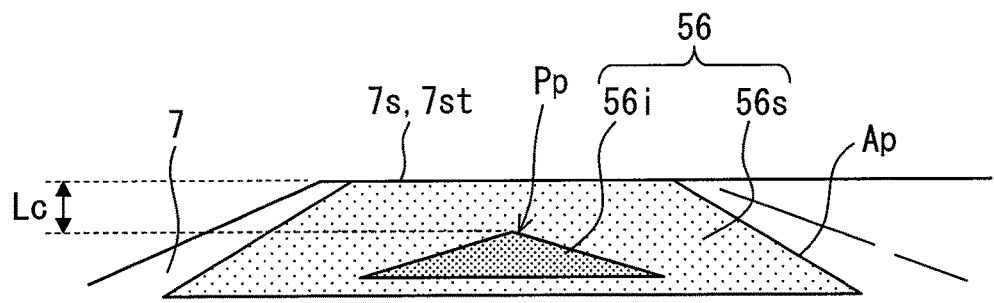
FIG. 5 is a schematic diagram showing the projection of the visible light image by the projector light in FIG. 1 on the road surface.

As shown in FIG. 1 to FIG. 3, a light image projection system 5 functioning as a light image projector includes a projector light 50 and a projection control ECU 51. The projector light 50 is provided by light image projection type headlights mounted on a right side and a left side of the front portion of the subject vehicle 2. The projector light 50 projects a visible light image 56 on a road surface 7 of a travelling road in front of the subject vehicle 2 via a projection apparatus mainly provided by a crystal liquid panel. The visible light image 56 is generated as shown in FIGS. 4 and 5. Specifically, in a vehicle width direction (that is, a horizontal direction), at a center of a projection area Ap in which the visible light image 56 is projected on the road surface 7, the informative light image 56$i$ is generated. The projector light 50 projects the visible light image 56 including the informative light image 56$i$ at the vehicle-width center of the projection area Ap on the road surface 7.

The informative light image 56$i$ is projected by the projector light 50 so that predetermined information is displayed outside the vehicle to an occupant in the subject vehicle 2. In the present embodiment, the informative light image 56$i$ represents a position of a gradient change portion 7$s$ at which the gradient of the road surface 7 is changed as shown in FIGS. 2, 3, 6, and 7. The gradient change portion 7$s$ includes a top portion 7$st$ and a sag portion 7$ss$. The top portion 7$st$ represents a section of the road surface 7 where the gradient gradually changes from an up direction to a down direction or from a horizontal direction to the down direction. The sag portion 7$ss$ represents a section of the road surface 7 where the gradient gradually changes from the down direction to the up direction or from the horizontal direction to the up direction.

Figure 8:
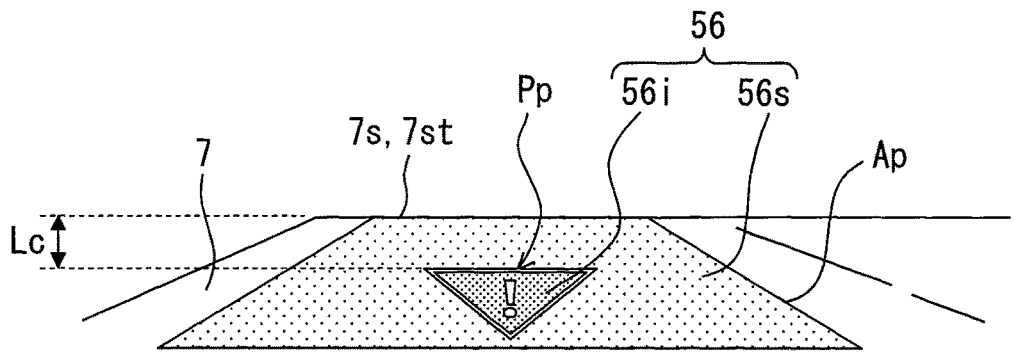
FIG. 8 is a schematic diagram showing the projection of the visible light image on the road surface by the projector light in FIG. 1 according to a modification different from FIG. 5.

As shown in FIGS. 4 and 5, the informative light image 56$i$ is projected at a position nearer to the occupant than the gradient change portion 7$s$, such as the top portion 7$st$ or the sag portion 7$ss$. With this configuration, the informative light image 56$i$ is displayed at a position nearer to the occupant than a position where the gradient change portion 7$s$ actually exists. In the informative light image 56$i$ of the present embodiment, an existing position of the gradient change portion 7$s$ is pointed by a vertex of a triangle. For another example, as shown in FIG. 8, the existing position of the gradient change portion 7s may be indicated by a base edge of an inverted triangle. An outline 56s surrounding the informative light image 56i of the visible light image 56, that is, an outline of projection area Ap has a trapezoid shape that has a long side at a farther position and a short side at a nearer position with respect to the occupant.

As shown in FIG. 1, the projection control ECU 51 is mainly provided by the microcomputer having a processor and a memory. Herein, the projection control ECU 51 is connected to the projector light 50 and the in-vehicle network 6. The projection control ECU 51 automatically controls the projection operation based on a command output from the vehicle control system 4. In the projection operation, the visible light image 56 including the informative light image 56i is projected by the projector light 50.

The vehicle control system 4 includes a vehicle sensor 40, an occupant sensor 41, a navigation unit 42, a vehicle control ECU 43, and an integrated ECU 44. The vehicle sensor 40 is connected to the in-vehicle network 6. The vehicle sensor 40 monitors a drive condition of the subject vehicle 2. The vehicle sensor 40 may be provided by a speed sensor, an attitude sensor, or a radio wave receiver. The speed sensor detects a speed of the subject vehicle 2, and outputs a speed signal corresponding to the detected speed. The attitude sensor detects an attitude of the subject vehicle 2 based on an acceleration or the like, and the attitude sensor outputs an attitude signal corresponding to the detected attitude. The radio wave receiver receives, for example, a radio wave output from a positioning satellite, a radio wave output from a transmitter of a different vehicle performing a vehicle to vehicle communication, or a radio wave output from a roadside unit performing a roadside to vehicle communication. The radio wave receiver outputs information signal corresponding to the received radio wave. The information signal may include subject vehicle information, which includes traveling position and vehicle speed or the like, the traffic information, and the obstacle information.

The occupant sensor 41 is connected to the in-vehicle network 6. The occupant sensor 41 detects a state of the occupant in the subject vehicle 2 or an operation made by the occupant. The occupant sensor 41 may be provided by a power switch, an occupant state monitor, or an assist switch. The power switch is configured to start an internal combustion engine or a motor generator of the subject vehicle 2. The power switch outputs a power signal in response to a turn-on operation made by the occupant in the subject vehicle 2. The occupant state monitor detects an occupant state by capturing an image of the occupant in the subject vehicle 2 using a light image sensor, and outputs a light image signal. The assist switch is configured to assist driving by controlling the projection of the light image in front of the subject vehicle 2 on the road surface 7. The assist switch outputs an assist signal in response to turn-on operation made by the occupant in the subject vehicle 2.

A navigation unit 42 is connected to the in-vehicle network 6. The navigation unit 42 displays navigation information, such as a scheduled drive route on a display device disposed in the subject vehicle 2. The navigation unit 42 displays, on the display device, the navigation information, which is stored in an own map database based on acquisition information from the ECU 31 and the output signal from the sensor 40, 41.

The vehicle control ECU 43 is mainly provided by the microcomputer having the processor and the memory. Herein, the vehicle control ECU 43 is connected to the in-vehicle network 6. The vehicle control ECU 43 may be one of an engine control ECU, a motor control ECU, or a brake control ECU. The engine control ECU controls the internal combustion engine in response to an operation made by the occupant on a gas pedal in the subject vehicle 2 in order to control the speed of the subject vehicle 2. The engine control ECU may also automatically control the speed of the subject vehicle 2. The motor control ECU controls the motor generator in accordance with an operation made by the occupant on the gas pedal in the subject vehicle 2 in order to control the speed of the subject vehicle 2. The motor control ECU may also automatically control the speed of the subject vehicle 2. The brake control ECU controls a brake actuator in accordance with an operation made by the occupant on a brake pedal in the subject vehicle 2 in order to control the speed of the subject vehicle, or the brake control ECU may automatically control the speed of the subject vehicle 2.

The integrated ECU 44 is mainly provided by the microcomputer having the processor 44p and the memory 44m, and is connected to the in-vehicle network 6. The integrated ECU 44 synchronizes other ECUs of the subject vehicle 2. The integrated ECU 44 controls the projection operation of the visible light image 56 which includes the informative light image 56i. Herein, the projection of the visible light image 56 is performed by the projector light 50. The integrated ECU 44 controls the projection operation performed by the projector light 50 through the projection control ECU 51. The projection may be controlled based on the acquisition information from the ECU 31, the output signal from the sensor 40, 41, and control information in the ECU 43. With the control of the projection, the integrated ECU 44 cooperates with the light image projection system 5 to construct a drive assist control apparatus. Hereinafter, a detail of the drive assist control apparatus will be described.

Figure 9:
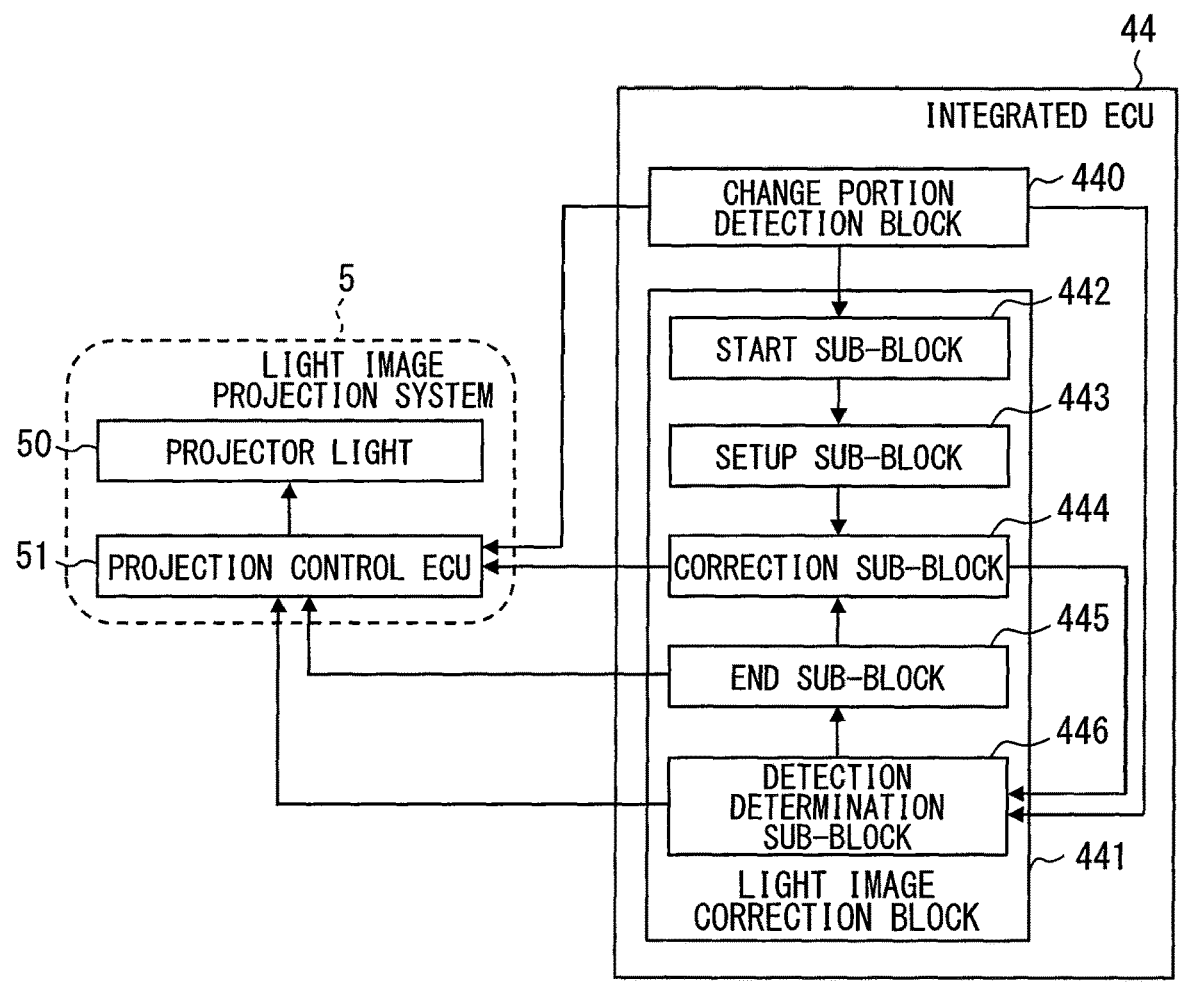
FIG. 9 is a block diagram showing each of the blocks configured by the integrated ECU in FIG. 1.

In the integrated ECU 44, as shown in FIG. 9, multiple blocks 440, 441 are functionally constructed by a drive assist control program executed by the processor 44p. At least a part of the blocks 440, 441 may be configured by a hardware including one or multiple ICs or the like.

A change portion detection block 440 corresponding to a change portion detector detects the top portion 7st or the sag portion 7ss as the gradient change portion 7s. The gradient change portion 7s may be detected based on the traffic information acquired by the ECU 31, the attitude represented by the attitude signal output from the attitude sensor, and the traffic information represented by the information signal output from the radio wave receiver. The change portion detection block 440 outputs a command to the projection control ECU 51 in response to a detection of the gradient change portion 7s. As a result, the projector light 50 starts projection of the visible light image 56, which includes the informative light image 56i, as shown in FIG. 4.

A light image correction block 441 in FIG. 9 corresponds to a light image corrector, and corrects at least the informative light image 56i of the visible light image 56 projected by the projector light 50. The light image correction block 441 includes multiple sub-blocks 442, 443, 444, 445, 446.

A start sub-block 442 determines whether to start correcting the informative light image 56i or not. In each case where the change portion detection block 440 detects the top portion 7st or the sag portion 7ss as the gradient change portion 7s, the start sub-block 442 determines to start correcting of the informative light image 56i when the projection position Pp (see FIG. 4) arrives at the gradient change portion 7s. The start of informative light image correction may be determined based on the traffic information acquired by the ECU 31, the attitude represented by the attitude signal output from the attitude sensor, the navigation information stored in the unit 42, the control information from the ECU 43, and the subject vehicle information and the traffic information represented by the information signal output from the radio wave receiver. With this determination, when an arrival of the projection position Pp to the gradient change portion 7s is determined, the correction of the informative light image 56i starts.

Figure 6:
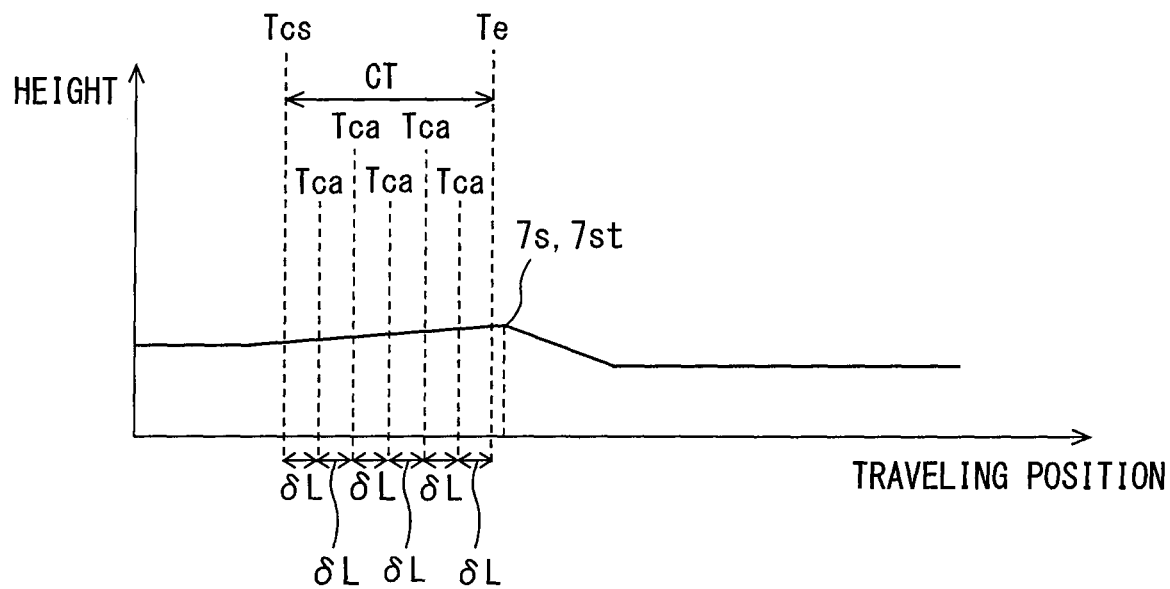
FIG. 6 is a graph showing a function of each of blocks configured by an integrated ECU in FIG. 1.
Figure 7:
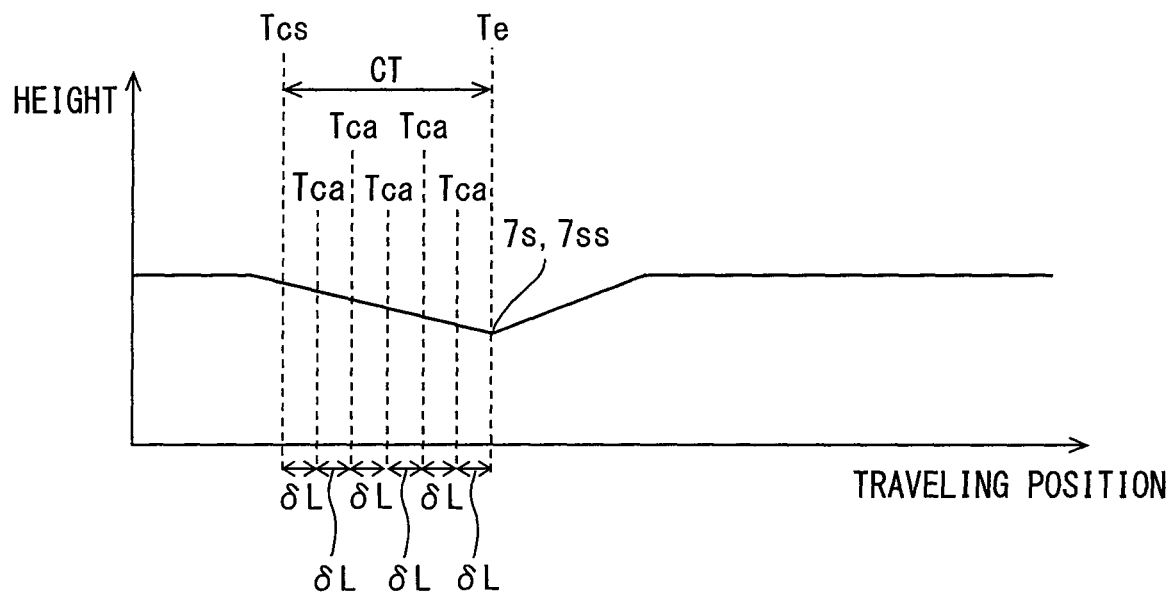
FIG. 7 is a graph showing the function of each of the blocks configured by the integrated ECU in FIG. 1.

A setup sub-block 443 sets a time point executing the correction of the informative light image 56i. As shown in FIGS. 6 and 7, the time points for correction include a time point $T_{cs}$ when the correction executed by the start sub-block 442 is started, and multiple time points $T_{ca}$ after the start of the correction. Each of the multiple time points $T_{ca}$ is set each time the subject vehicle 2 approaches the gradient change portion 7s by a predetermined distance δL. The predetermined distance δL is defined between the gradient change portion 7s, which is detected by the change portion detection block 440, and the position of the subject vehicle 2 corresponding to the correction start time point $T_{cs}$. In the present embodiment, the predetermined distance δL is set to decrease with an increase of the speed of the subject vehicle 2 at the time point $T_{cs}$. As described above, the predetermined distance δL is used for determining each time point $T_{ca}$ after the correction is started. The predetermined distance δL may be set based on the speed represented by the speed signal from the speed sensor, the control information in the ECU 43, and the subject vehicle information represented by the information signal output from the radio wave receiver. In an example case shown in FIGS. 6 and 7, when the gradient change portion 7s is positioned thirty meters ahead of the subject vehicle 2, the correction is executed each time the subject vehicle 2 approaches the gradient change portion 7s by five-meters as the predetermined distance δL.

Figure 10A:
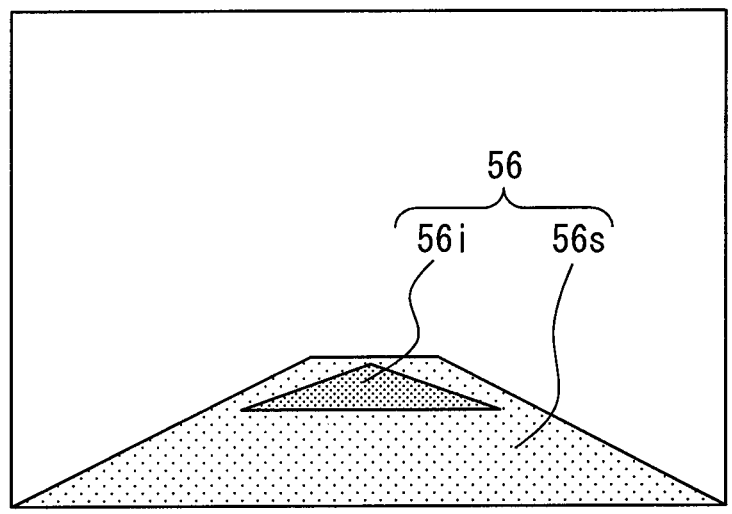
FIG. 10A is a schematic diagram showing the visible light image generated before projection by the projector light in FIG. 1.
Figure 10B:
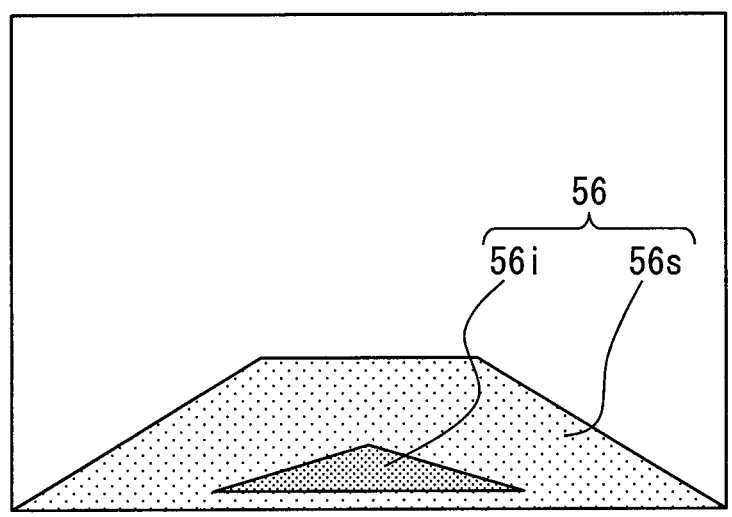
FIG. 10B is a schematic diagram showing the visible light image projected by the projector light in FIG. 1.

A correction sub-block 444 shown in FIG. 9 corrects the informative light image 56i at each time point $T_{cs}$, $T_{ca}$ set by the setup sub-block 443. This correction is executed to the projection position $P_p$ of the informative light image 56i. As shown in FIGS. 5 and 8, the projection position $P_p$ is moved to a nearer position with respect to the occupant than the gradient change portion 7s detected by the change portion detection block 440. In the present embodiment, the projection position $P_p$, is moved to the nearer position with respect to the occupant than the gradient change portion 7s, that is, the corrected projection position $P_p$ is spaced from the gradient change portion 7s by a predetermined distance $L_c$ toward the subject vehicle 2. The predetermined distance $L_c$ may be adjusted corresponding to the speed of the subject vehicle 2 at the correction start time point $T_{cs}$. FIG. 10A shows the visible light image 56 that the projection apparatus of the projector light 50 projects before the visible light image 56 is corrected by the correction sub-block 444. FIG. 10B shows the visible light image 56 that the projection apparatus of the projector light 50 projects after the visible light image 56 is corrected by the correction sub-block 444. In the correction, the informative light image 56i is moved to the nearer position with respect to the occupant, that is, the informative light image 56i is moved close to a bottom line of the triangle with respect to the occupant.

With the above-described correction, the correction sub-block 444 corrects the shape, the size, and a color of the informative light image 56i. As shown in FIGS. 5 and 8, the shape and the size of the informative light image 56i are corrected corresponding to a gradient angle of the road surface 7. In the present embodiment, the attitude and the position of the subject vehicle 2 are further considered in the correction of the shape and the size of the informative light image 56i. The shape and the size of the projection may be corrected based on the traffic information acquired by the ECU 31, the attitude represented by the attitude signal output from the attitude sensor, the navigation information stored in the unit 42, and the subject vehicle information and the traffic information represented by the information signal output from the radio wave receiver.

The color of the informative light image 56i is corrected against the previous color such as green. At the correction start time point $T_{cs}$, the color of the informative light image 56i changes to another color, such as yellow which more visually stimulates the occupant than the color displayed before the correction start time point $T_{cs}$. At the time point $T_{ca}$ after the correction start time point $T_{cs}$, the color of the informative light image 56i changes to another color, such as red which more visually stimulates the occupant than the color displayed at the correction start time point $T_{cs}$ and the color displayed before the correction start time point $T_{cs}$. With this correction, in the present embodiment, a level at which the informative light image stimulates the occupant increases when the subject vehicle 2 approaches toward the gradient change portion 7s.

The correction sub-block 444 corrects the outline 56s surrounding the informative light image 56i of the visible light image 56 in addition to the informative light image 56i. The shape and the size of the visible light image 56, that is, the shape and the size of projection area Ap are corrected corresponding to the shape and the size of the informative light image 56i. The color of the outline 56s surrounding the informative light image 56i of the visible light image 56 is adjusted to a constant color, such as white in order to show a contrast against the informative light image 56i.

The correction sub-block 444, which corrects the above-described various projection states, stores the correction content in a history region 44mr included in the memory 44m shown in FIG. 1. In the history region 44mr, each time the latest correction content is stored, the old history is replaced to the latest correction content.

An end sub-block 445 shown in FIG. 9 determines whether to end the correction of the informative light image 56i or not. In a case where the gradient change portion 7s detected by the change portion detection block 440 is the top portion 7st, an end of the correction is determined when it is supposed that the subject vehicle 2 arrives at the gradient change portion 7s. In the present embodiment, when the subject vehicle 2 travels to a position which enables a projection of the informative light image at a position farther than the top portion 7st, the subject vehicle 2 is supposed to arrive at the gradient change portion 7s. When the supposition for arrival at the gradient change portion 7s is determined, the correction of the informative light image 56i is ended at a time point $T_e$ shown in FIG. 6. The supposition for arrival indicates a supposition that the subject vehicle 2 arrives at the gradient change portion 7s. In a case where the gradient change portion 7s detected by the change portion detection block 440 is the sag portion 7ss, the end of the correction is determined when the subject vehicle 2 arrives at the gradient change portion 7s. With this determination, when an arrival at the gradient change portion 7s is determined, the correction of the informative light image 56i ends at a time point $T_e$ shown in FIG. 7. Each of the determinations may be performed based on the traffic information acquired by the ECU 31, the attitude represented by the attitude signal output from the attitude sensor, the navigation information stored in the unit 42, and the subject vehicle information and the traffic information represented by the information signal output from the radio wave receiver.

A detection determination sub-block 446 shown in FIG. 9 determines whether the detection of the gradient change portion 7s planed by the change portion detection block 440 is normally executed or not during a correction period CT (see FIGS. 6 and 7). The correction period CT is defined as a time period from the correction start time point $T_{cs}$ when the start sub-block 442 starts correction to the end time point $T_e$ when the end sub-block 445 ends the correction. During the correction period CT while the subject vehicle 2 has not arrived at the gradient change portion 7s or the subject vehicle 2 is supposed to not yet arrive at the gradient change portion 7s, the detection of the gradient change portion 7s must be able to be executed. So, during the correction period CT, the detection determination sub-block 446 determines whether the gradient change portion 7s is detected as planed or not. In this determination, when normal detection is determined at the time point $T_{cs}$, $T_{ca}$, the correction by the correction sub-block 444 is permitted. When an interruption of the detection is determined at the time point $T_{cs}$, $T_{ca}$, the correction is executed based on the history stored in the history region 44mr instead of the real-time correction by the correction sub-block 444. The interruption of the detection may include the interruption of the acquisition of the information that is necessary for the detection of the gradient change portion 7s by a disturbance. Since the correction is executed based on the history data, the same correction can be executed as the correction performed before the interruption of the detection to the above-described projection state, such as the projection position $P_p$ of the informative light image 56i.

Figure 11:
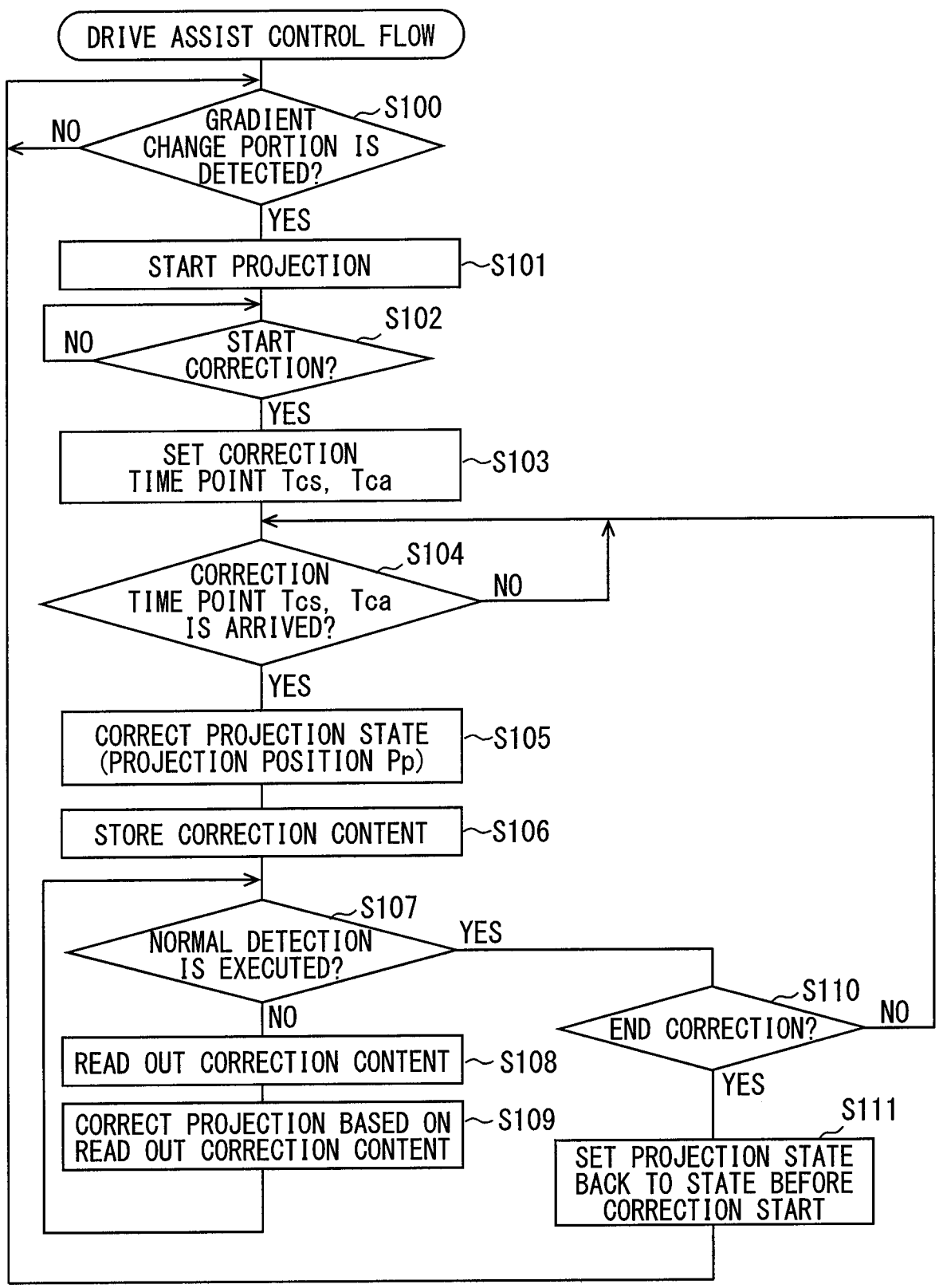
FIG. 11 is a flowchart showing a flow of a drive assist control executed by the integrated EUC in FIG. 1.

With the above-described integrated ECU 44 including the blocks 440, 441, a drive assist control flow functioning as a drive assist control method is achieved as shown in FIG. 11. The following will describe the detail of the drive assist control flow. In the drive assist control flow of the subject vehicle 2, when the power switch and the assist switch are turned on, the flow starts. When the power switch or the assist switch is turned off, the flow ends. An "S" in the drive assist control flow indicates each step. The memory 44m of the integrated ECU 44 stores a control program, which achieves the drive assist control flow. The memory 44m and memories of different ECUs are configured by one or more storage mediums, such as magnetic mediums or optical mediums.

In S100, the change portion detection block 440 determines whether the gradient change portion 7s is detected or not. When the gradient change portion 7s is not detected, the flowchart repeatedly executes S100. When the gradient change portion 7s is detected, the flowchart shifts to S101. In S101, the change portion detection block 440 outputs a command to the projection control ECU 51 in order to start projection of the visible light image 56 including the informative light image 56i by the projector light 50.

In S102, the start sub-block 442 determines whether to start the correction of the informative light image 56i or not. Specifically, in S102, the start sub-block 442 determines whether the projection position $P_p$ of the informative light image 56i arrives at the gradient change portion 7s detected in S100 or not. When the projection position $P_p$ of the informative light image 56i does not arrive at the gradient change portion 7s, the flowchart repeatedly executes S102. When the projection position $P_p$ of the informative light image 56i arrives at the gradient change portion 7s, the flowchart shifts to S103.

In S103, the setup sub-block 443 sets the time point $T_{cs}$, $T_{ca}$ at which the correction is executed to the informative light image 56i. In S104, the setup sub-block 443 determines whether the present time arrives at the time point $T_{cs}$ or $T_{ca}$ or not. When the present time does not arrive at the time point $T_{cs}$ or $T_{ca}$, the flowchart repeatedly executes S104. When the present time arrives at the time point $T_{cs}$ or $T_{ca}$, the flowchart shifts to S105.

In S105, the correction sub-block 444 corrects the visible light image 56 including the informative light image 56i. In the visible light image 56 including the informative light image 56i, the projection position $P_p$ is moved to nearer position than the gradient change portion 7s with respect to the occupant, and the shape, the size, and the color of the informative light image 56i are corrected. For the outline 56s surrounding the informative light image 56i of the visible light image 56, the shape and the size are corrected.

In S106 following S105, the correction sub-block 444 stores the correction content executed in S105 in the history region 44mr included in the memory 44m. In S107, the detection determination sub-block 446 determines whether the detection of the gradient change portion 7s is normally executed according to a detection plan in the change portion detection block 440. When the interruption of the normal detection of the gradient change portion 7s is determined, the flowchart shifts to S108. When the normal detection of the gradient change portion 7s is determined according to the detection plan in the change portion detection block 440, the flowchart shifts to S110.

In S108 following a determination of the interruption of the normal detection in S107, the detection determination sub-block 446 reads out the correction content stored in the history region 44mr included in the memory 44m. In S109, the detection determination sub-block 446 corrects the visible light image 56 including the informative light image 56i based on the readout correction content, and then, the flowchart returns to S107.

In S110 following a determination of the interruption of the normal detection in S107, the end sub-block 445 determines whether to end the correction of the informative light image 56i or not. When the gradient change portion 7s detected in S107 is the top portion 7st, in S110, the end sub-block 445 determines whether the subject vehicle 2 is supposed to arrive at the gradient change portion 7s or not. When the gradient change portion 7s detected in S107 is the sag portion 7ss, in S110, the end sub-block 445 addition to vehicle 2 arrives at the gradient change portion 7s or not. In each case of the detection of the top portion 7st or the sag portion 7ss, when the end sub-block 445 does not determine the supposition for arrival or the arrival, the flowchart returns to S104. In each case of the detection of the top portion 7st or the sag portion 7ss, when the end sub-block 445 determines the supposition for arrival or the arrival, the flowchart shifts to S111. In S111, the end sub-block 445 sets various projection states of the informative light image 56i, such as the projection position $P_p$ back to the states before the start of the correction, such as the original position, and then, the flowchart returns to S100.

In the first embodiment, S100 corresponds to a change portion detection step, S101 corresponds to a light image projection step, and S102 to S111 correspond to a light image correction step.

Advantages

The following will describe advantages of the first embodiment.

In the first embodiment, when the gradient change portion 7s of the road surface where the road surface gradient changes is detected, the projection position of the informative light image 56i is corrected nearer to the occupant than the gradient change portion 7s. This configuration can avoid projecting the informative light image 56i at a position farther than the gradient change portion 7s. Thus, the information can be displayed visually and correctly.

In the first embodiment, each time the subject vehicle 2 travels toward the gradient change portion 7s by the predetermined distance δL, the projection position $P_p$ of the informative light image 56i is corrected. With this configuration, the informative light image 56i can be projected on the proper position with consideration of the distance between the subject vehicle 2 and the gradient change portion 7s. Thus, the information can be displayed visually and correctly. In the first embodiment, the predetermined distance δL is set to be decreased with an increase of the speed of the subject vehicle 2. Thus, not only the distance between the subject vehicle 2 and the gradient change portion 7s but also the speed of the subject vehicle 2 is considered in the projection of the informative light image 56i at a proper position. Thus, the information can be displayed visually and correctly.

In the first embodiment, when the projection position $P_p$ of the informative light image 56i arrives at the gradient change portion 7s, the correction of the projection position $P_p$ is started. This configuration can surely avoid projecting the informative light image 56i farther than the gradient change portion 7s. Thus, the information can be displayed visually and correctly.

In the first embodiment, when the subject vehicle 2 arrives at or is supposed to arrive at the gradient change portion 7s, the correction of the projection position $P_p$ of the informative light image 56i is ended. With this configuration, after the projection of the informative light image 56i at a position farther than the gradient change portion 7s is avoided, the projection position $P_p$ rapidly returns to the originally set predetermined place. Thus, the information can be displayed visually and correctly.

In the first embodiment, when the detection of the gradient change portion 7s, which is planned after the start of the correction, is interrupted, the same correction carried out before the interruption of the detection is executed to the informative light image 56i. With this configuration, when the planned detection of the gradient change portion 7s is incorrectly interrupted, the correction of the projection position $P_p$ of the informative light image 56i can be continued. This correction can avoid projecting the informative light image 56i at a position farther than the gradient change portion 7s. Thus, the information can be displayed visually and correctly at a higher reliability.

In the first embodiment, along with the correction of the projection position $P_p$ of the informative light image 56i to a nearer position than the gradient change portion 7s with respect to the occupant, the shape and the size of the informative light image 56i are corrected based on the gradient angles of the road surface 7. This configuration can avoid projecting the informative light image 56i at a position farther than the gradient change portion 7s, and can also prevent the distortion of the informative light image 56i, which is caused by the gradient of the road surface 7 existing between the vehicle position and the gradient change portion 7s. According to the first embodiment, the information can be more effectively displayed visually and correctly.

In the first embodiment, the color of the informative light image 56i is corrected. With this configuration, when the subject vehicle 2 approaches the gradient change portion 7s, more visually stimulative light image is displayed to the occupant. Thus, the visually stimulative light image can attract the occupant's attention on the gradient change portion 7s where the occupant is likely to make a determination mistake. Thus, driving safety can be improved. The informative light image 56i, which correctly displays the information with the corrected projection position can contribute to securing of the driving safety.

Second Embodiment

Figure 12:
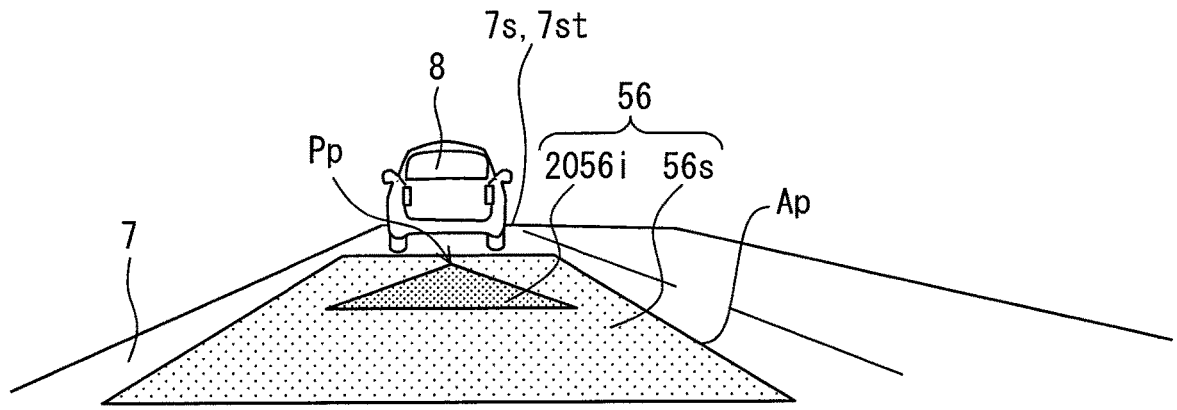
FIG. 12 is a schematic diagram showing the projection of the visible light image on the road surface by the projector light in a second embodiment.
Figure 13:
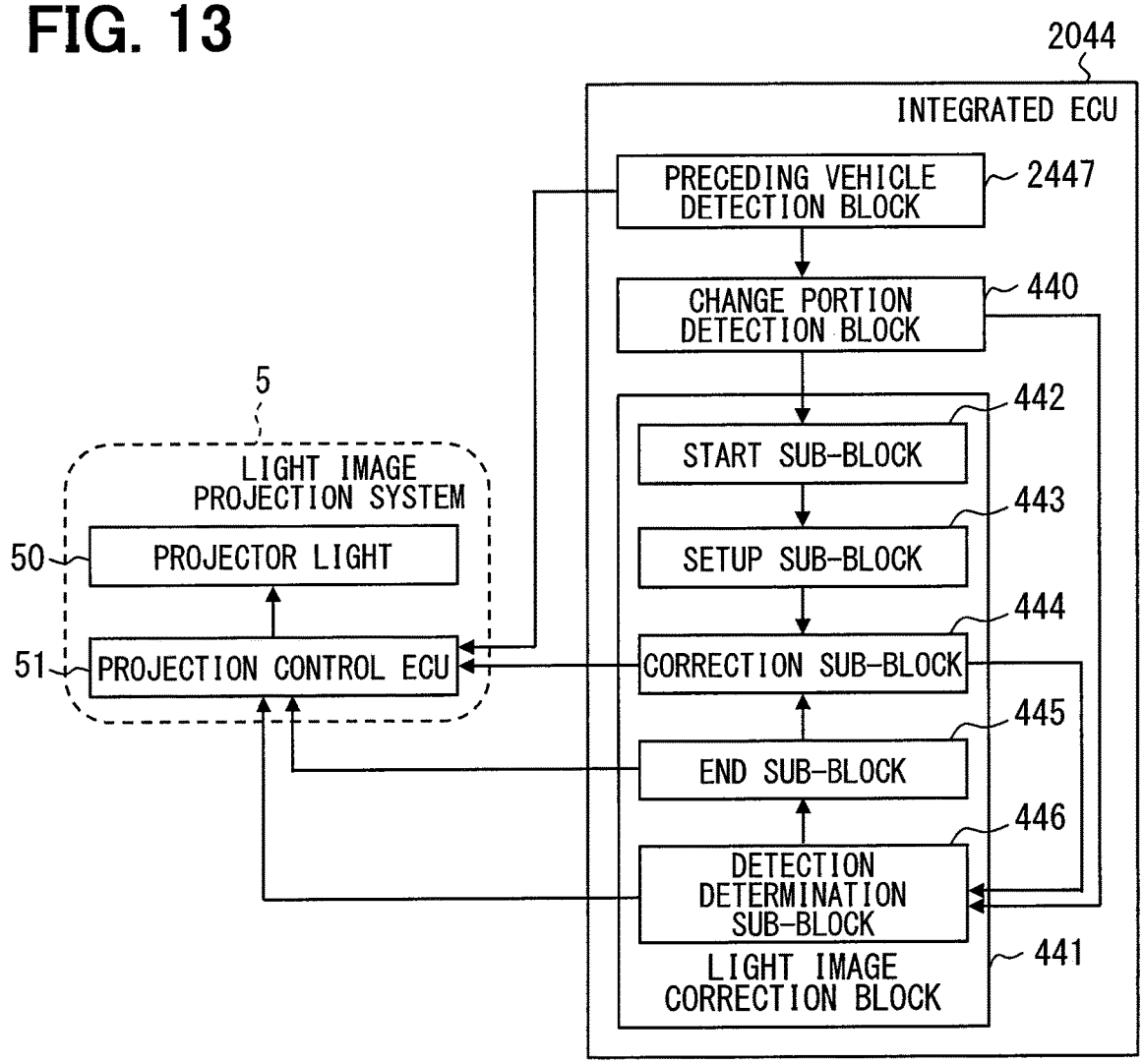
FIG. 13 is a block diagram showing each of the blocks configured by the integrated ECU in the second embodiment.
Figure 14:
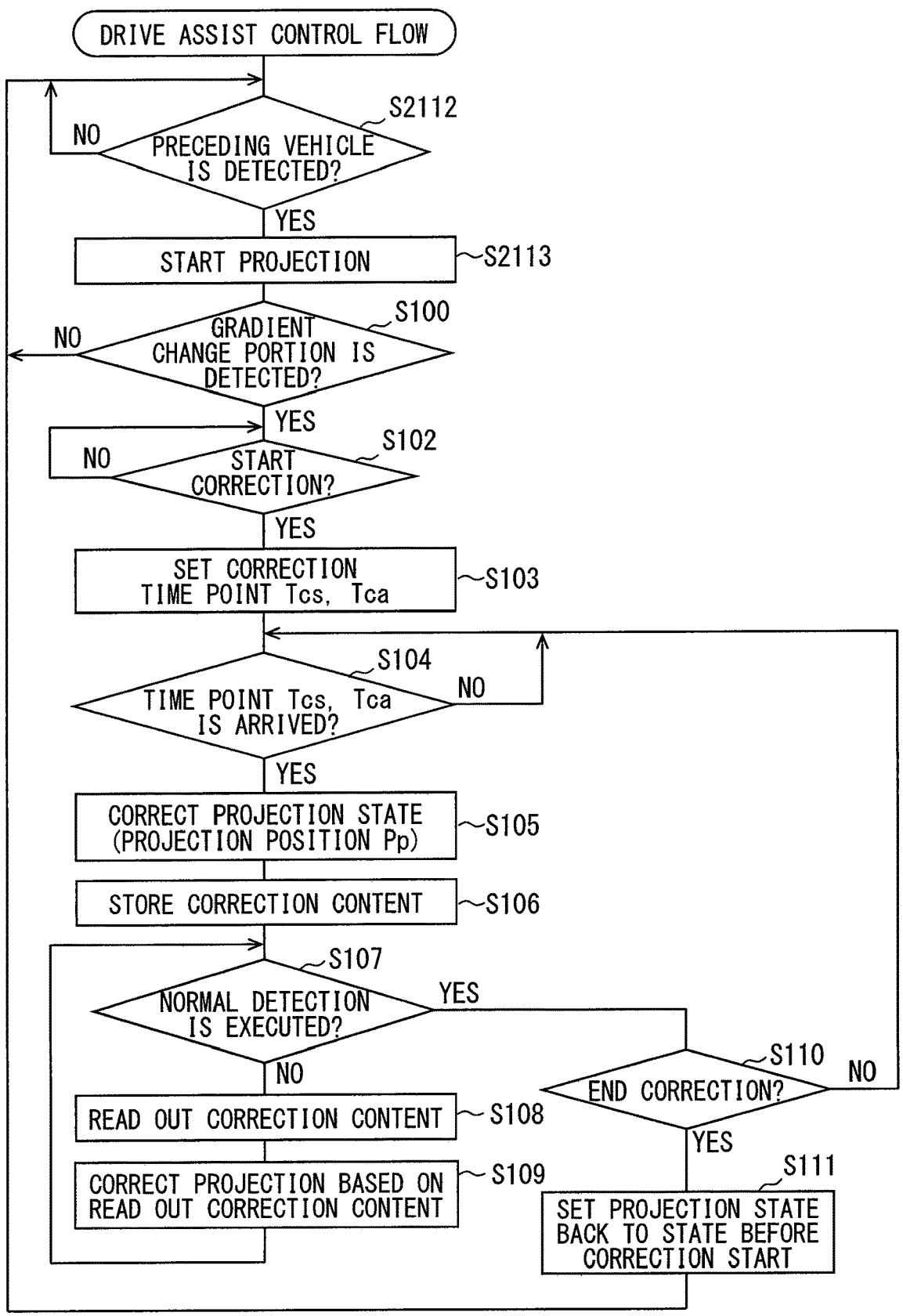
FIG. 14 is a flowchart showing the flow of the drive assist control executed by the integrated EUC in the second embodiment.

As shown in FIGS. 12 to 14, the second embodiment of the present disclosure is a modification of the first embodiment.

In the informative light image 2056i according to the second embodiment shown in FIG. 12, a preceding vehicle 8 exists as the obstacle existing in front of the subject vehicle. The preceding vehicle 8 is detected by the outer sensor 30 outside the subject vehicle 2. The informative light image 2056i is projected at a position nearer to the occupant than the preceding vehicle 8. Thus, the informative light image 2056i indicates the existence of the preceding vehicle 8 from a position nearer to the occupant. In the second embodiment, the vertex of the triangle of the informative light image 2056i points the existing position of the preceding vehicle 8. With reference to FIG. 8 in the first embodiment, the existing position of the preceding vehicle 8 may be indicated by a base edge of an inverted triangle. The shape and the size of the outline 56s surrounding the informative light image 2056i of the visible light image 56 are same as the first embodiment.

In the second embodiment, as shown in FIG. 13, the integrated ECU 2044 further includes a preceding vehicle detection block 2447. The preceding vehicle detection block 2447 detects the preceding vehicle 8, which is in the followed state. The followed state may be a state in which the distance between the subject vehicle 2 and the preceding vehicle 8 is within, for example, 100 meters. The preceding vehicle 8 may be detected based on the obstacle information and the traffic information acquired by the ECU31, the navigation information stored in the unit 42, the control information in the ECU43, and the subject vehicle information, the obstacle information, and the traffic information represented by the information signal output from the radio wave receiver. With the detection of the preceding vehicle 8, the preceding vehicle detection block 2447 outputs a command to the projection control ECU 51 in order to start the projection of the informative light image 2056i of the visible light image 56 by the projector light 50. Corresponding to this configuration, the change portion detection block 440 in the second embodiment is not equipped with a projection start function.

In the second embodiment, the drive assist control flow executed in the first embodiment is executed except for that the informative light image 56i is changed to the informative light image 2056i.

As shown in FIG. 14, the drive assist control flow in the second embodiment executes S2112, S2113 before execution of S100. In S2112, the preceding vehicle detection block 2447 determines whether a preceding vehicle 8 is detected or not. When the preceding vehicle 8 is not detected, the flowchart repeatedly executes S2112. When the preceding vehicle 8 is detected, the flowchart shifts to S2113. In S2113, the preceding vehicle detection block 2447 outputs a command to the projection control ECU 51 to start projection of the visible light image 56 including the informative light image 2056i by the projector light 50.

In S100 that follows S2113, when the gradient change portion 7s is not detected, detected, the flowchart returns to S2112. When the gradient change portion 7s is detected, the flowchart shifts to S102. In the second embodiment, the flowchart omits S101 that is executed in the first embodiment. After the flowchart executes S111, the flowchart returns to S2112.

The above-described second embodiment can provide similar advantages as the first embodiment. In the second embodiment, S2113 corresponds to the light image projection step.

Third Embodiment

Figure 15:
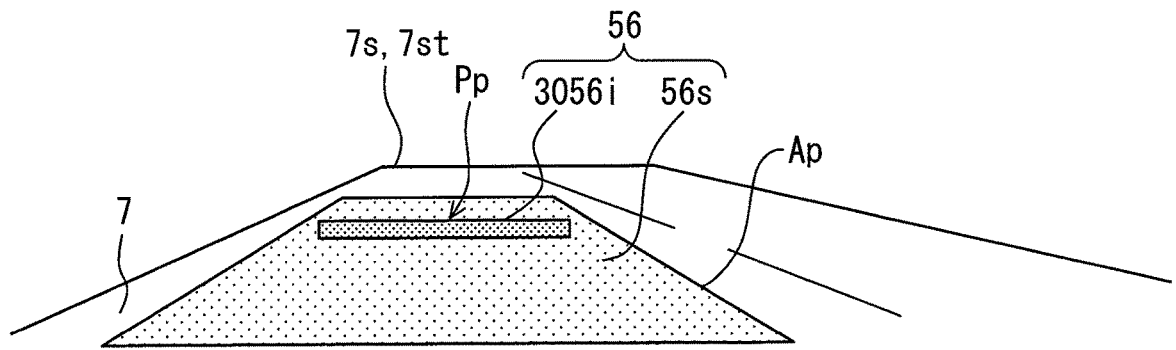
FIG. 15 is a schematic diagram showing the projection of the visible light image on the road surface by the projector light in a third embodiment.
Figure 16:
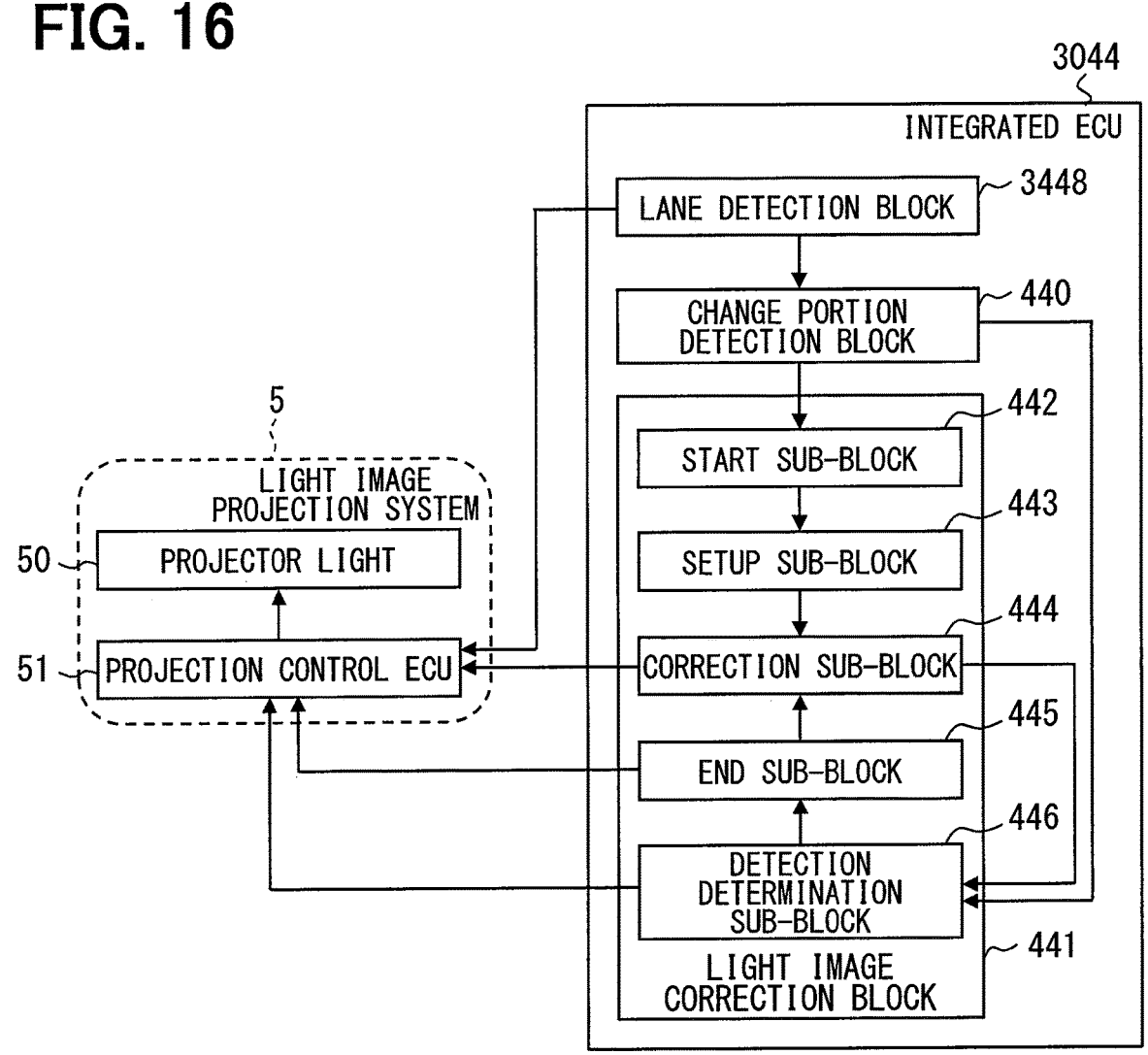
FIG. 16 is a block diagram showing each of the blocks configured by the integrated ECU in the third embodiment.
Figure 17:
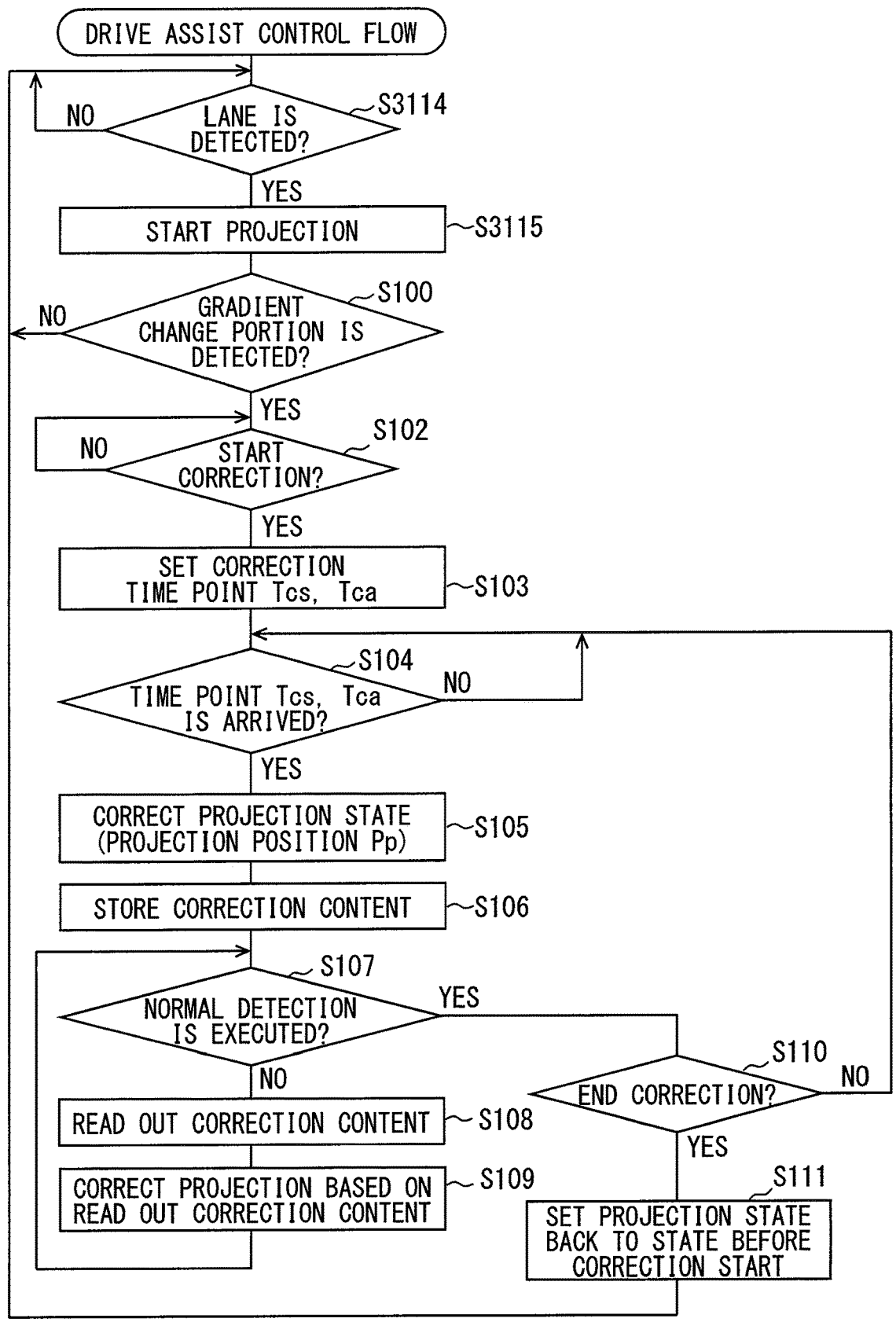
FIG. 17 is a flowchart showing the flow of the drive assist control executed by the integrated EUC in the third embodiment.

As shown in FIGS. 15 to 17, the third embodiment of the present disclosure is a modification of the first embodiment.

The informative light image 3056i of the third embodiment shown in FIG. 15 represents a width of a traffic lane. The traffic lane extends in front direction outside the subject vehicle 2. The informative light image 3056i is projected along a vehicle width direction in a straight manner from a left edge to a right edge of the traffic lane. The informative light image 3056i represents the width of the traffic lane in the vehicle width direction. The shape and the size of the outline 56s surrounding the informative light image 3056i of the visible light image 56 are same as the first embodiment.

In the third embodiment, as shown in FIG. 16, the integrated ECU 3044 further includes a lane detection block 3448. The lane detection block 3448 detects the traffic lane that extends in front direction outside the subject vehicle 2. The traffic lane may be detected based on the obstacle information and the traffic information acquired by the ECU31, the navigation information stored in the unit 42, and the obstacle information and the traffic information represented by the information signal output from the radio wave receiver. With the detection of the traffic lane, the lane detection block 3448 outputs a command to the projection control ECU 51 in order to start projection of the informative light image 3056i of the visible light image 56 by the projector light 50. Thus, the change portion detection block 440 in the third embodiment is not equipped with the projection start function.

In the third embodiment, the drive assist control flow in the first embodiment is executed except for that the informative light image 56i is changed to the informative light image 3056i.

As shown in FIG. 17, the drive assist control flow in the third embodiment executes S3114, S3115 before execution of S100. In S3114, the lane detection block 3448 determines whether a traffic lane is detected or not. When the traffic lane is not detected, the flowchart repeatedly executes S3114. When the traffic lane is detected, the flowchart shifts to S3115. In S3115, the lane detection block 3448 outputs a command to the projection control ECU 51 to start projection of the visible light image 56 including the informative light image 3056i by the projector light 50.

In S100 that follows S3115, when the negative determination is made, the flowchart returns to S3114, and when the positive determination is made, the flowchart shifts to S102. In the third embodiment, the flowchart does not execute S101 that is executed in the first embodiment. After executing S111, the flowchart returns to S3114.

The above-described configuration in the third embodiment can provide similar advantage as the first embodiment. In the third embodiment, S3115 corresponds to the light image projection step.

Embodiments of the present disclosure have been described above. The present disclosure should not be limited to the above embodiments and may be implemented in various other embodiments and combinations without departing from the scope of the present disclosure.

First Modification

According to a first modification, in S105 and the correction sub-block 444, the predetermined distance δL may be set to a fixed value regardless of the speed of the subject vehicle 2. The predetermined distance δL according to the first modification may also be set by the occupant. Specifically, the occupant may input the value of the predetermined distance δL a using the occupant sensor 41 functioning as an input device.

Second Modification

According to a second modification, in S105 and the correction sub-block 444, each of the time points $T_{ca}$ may be set each time a preset duration elapses from the correction start time point $T_{cs}$. The preset duration may be set to be decreased with an increase of the vehicle speed in the second modification. Alternatively, the preset duration in the second modification may be set to a fixed value regardless of the speed of the vehicle. The preset duration in the second modification may be set by the occupant. Specifically, the occupant may input the value of the preset duration using the occupant sensor 41 functioning as the input device.

Third Modification

According to a third modification, in S105 and the correction sub-block 444, the shape and the size of the informative light image 56i, 2056i, 3056i may not be corrected.

Fourth Modification

According to a fourth modification, in S105 and the correction sub-block 444, the shape and the size of the outline 56s surrounding the informative light image 56i, 2056i, 3056i of the visible light image 56 may not be corrected.

Fifth Modification

According to a fifth modification, in S105 and the correction sub-block 444, the color of the informative light image 56i, 2056i, 3056i may not be corrected.

Sixth Modification

According to a sixth modification, in S105 and the correction sub-block 444, instead of or in addition to the correction of the color of the informative light image 56i, the informative light image 56i may be displayed in a blinking manner, and a frequency of the blinking display may be changed with an approach of the vehicle to the gradient change portion. With this configuration, when the subject vehicle 2 approaches the gradient change portion 7s, the display of the informative light image 56*i* can be performed in more visible and stimulative manner to the occupant.

Seventh Modification

Figure 18:
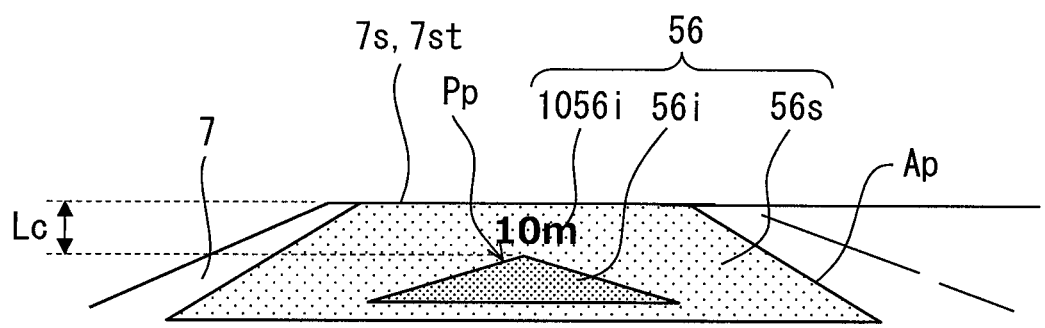
FIG. 18 is a schematic diagram showing the projection of the visible light image on the road surface according to a modification different from FIG. 5.

According to a seventh modification, in S105 and the correction sub-block 444, as shown in FIG. 18, instead of or in addition to the informative light image 56*i*, 2056*i*, 3056*i*, the informative light image 1056*i*, which represents the distance between the subject vehicle 2 and the gradient change portion 7*s*, may be projected on the road surface 7. In the seventh modification, the correction of the informative light image 1056*i* is executed in a similar manner as the correction of the informative light image 56*i*, 2056*i*, 3056*i*.

Eighth Modification

According to an eighth modification, in S102 and the start sub-block 442, the correction of the informative light image 56*i* may be started before the projection position $P_p$ arrives at the gradient change portion 7*s*. Specifically, in the eighth modification, when the gradient change portion 7*s* is determined by the change portion detection block 440 in S100 prior to the arrival of the projection position at the gradient change portion 7*s*, the correction of the informative light image 56*i* may be started.

Ninth Modification

According to a ninth modification, in S110 and end sub-block 445, before the subject vehicle 2 arrives at or is supposed to arrive at the gradient change portion 7*s*, the correction of the informative light image 56*i* may be ended. Specifically, in the ninth modification, the correction of the informative light image 56*i* may be ended at the time point $T_{ca}$ that is prior to the arrival of the subject vehicle at the gradient change portion 7*s*.

Tenth Modification

In a tenth modification, the detection determination sub-block 446 may be omitted, and the correction sub-block 444 may not store the correction content. With this configuration of the tenth modification, execution of S106 to S109 may be omitted.

Eleventh Modification

In an eleventh modification, the processors of the multiple ECUs including the integrated ECU 44 may achieve the drive assist control apparatus. Alternatively, the processor of at least one ECU except for the integrated ECU 44 may achieve the drive assist control apparatus. In the eleventh modification, different ECUs except for the integrated ECU 44 functioning as the drive assist control apparatus may include the projection control ECU 51 and the peripheral monitor ECU 31.

Twelfth Modification

In a twelfth modification, the detection of the preceding vehicle 8 may be replaced with the detection of the gradient change portion 7*s* as described in the second embodiment. With this configuration, the projection position $P_p$ of the informative light image 56*i*, 2056*i*, 3056*i* may be moved to a nearer position to the occupant than the preceding vehicle 8.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A drive assist control apparatus assisting a driving of a vehicle by controlling a light image projected on a road surface in front of the vehicle, the drive assist control apparatus comprising:
    a light image projector projecting an informative light image on the road surface, wherein the informative light image represents information to be displayed to an occupant in the vehicle;
    a change portion detector detecting a gradient change portion of the road, the gradient change portion indicating a position at which a gradient angle of the road surface changes; and
    a light image corrector correcting a projection position of the informative light image projected by the light image projector,
    wherein the light image corrector moves the projection position of the informative light image on the road surface to a position nearer to the occupant than the gradient change portion detected by the change portion detector.

2. The drive assist control apparatus according to claim 1, wherein
    the light image corrector corrects the projection position each time the vehicle approaches the gradient change portion by a predetermined distance.

3. The drive assist control apparatus according to claim 2, wherein
    the light image corrector decreases the predetermined distance with an increase of a speed of the vehicle.

4. The drive assist control apparatus according to claim 1, wherein
    the light image corrector starts a correction of the projection position in response to the projection position arriving at the gradient change portion.

5. The drive assist control apparatus according to claim 4, wherein
    the light image corrector ends the correction of the projection position in response to the vehicle arriving at the gradient change portion or the vehicle is supposed to arrive at the gradient change portion.

6. The drive assist control apparatus according to claim 4, wherein,
    after the correction of the projection position starts, in response to a detection of the gradient change portion to be executed by the change portion detector being interrupted, the light image corrector corrects the projection position in a same manner as a previous correction of the projection position.

7. The drive assist control apparatus according to claim 1, wherein,
    in addition to the correction of the projection position, the light image corrector corrects a shape and a size of the informative light image projected by the light image projector corresponding to a gradient angle of the road surface.

8. The drive assist control apparatus according to claim 1, wherein the light image corrector corrects the informative light image projected by the light image projector so that the informative light image visually stimulates the occupant with an increasing level in response to the vehicle approaching the gradient change portion.

9. A control method for drive assist which assists a driving of a vehicle by controlling a light image projected on a road surface in front of the vehicle, the control method for drive assist comprising:

projecting an informative light image on the road surface, wherein the informative light image represents information to be displayed to an occupant in the vehicle;

detecting a gradient change portion of the road, the gradient change portion indicating a position at which a gradient angle of the road surface changes; and correcting a projection position of the informative light image on the road surface to a position nearer to the occupant than the gradient change portion detected on the road surface.

10. A drive assist control apparatus assisting a driving of a vehicle by controlling a light image projected on a road surface in front of the vehicle, the drive assist control apparatus comprising:

a light image projector projecting an informative light image on the road surface, wherein the informative light image represents information to be displayed to an occupant in the vehicle;

a change portion detector detecting a gradient change portion of the road, the gradient change portion indicating a position at which a gradient angle of the road surface changes; and a light image corrector correcting a projection position of the informative light image projected by the light image projector relative to the gradient change portion of the road, wherein the light image corrector moves the projection position of the informative light image on the road surface relative to the gradient change portion of the road and to a position nearer to the occupant than the gradient change portion detected by the change portion detector such that distortion of the informative light image by the position at which the gradient angle of the road surface changes is inhibited.

* * * * *